United States Patent
Kominkiewicz

(10) Patent No.: US 6,957,510 B1
(45) Date of Patent: Oct. 25, 2005

(54) FLY SWATTING APPARATUS

(76) Inventor: Ronald F. Kominkiewicz, 18 Lafayette Ave., Voorhees, NJ (US) 08043

(*) Notice: Subject to any disclaimer, the term of this patent is extended or adjusted under 35 U.S.C. 154(b) by 0 days.

(21) Appl. No.: 10/872,590

(22) Filed: Jun. 21, 2004

(51) Int. Cl.[7] ............................ A01M 3/02; A01M 3/04
(52) U.S. Cl. ........................................ 43/137; 43/136
(58) Field of Search ......................... 43/114, 115, 133, 43/134, 136, 137

(56) References Cited

U.S. PATENT DOCUMENTS

| | | | | |
|---|---|---|---|---|
| 1,370,496 A | * | 3/1921 | Ratcliff .......................... | 43/137 |
| 2,015,092 A | * | 9/1935 | Turnquist ...................... | 43/137 |
| 2,488,317 A | * | 11/1949 | Murray ........................ | 156/253 |
| 2,578,183 A | * | 12/1951 | Furst ............................ | 43/137 |
| 3,449,856 A | * | 6/1969 | Weaver ......................... | 43/136 |
| 3,963,358 A | * | 6/1976 | Houser ......................... | 401/195 |
| 4,030,842 A | * | 6/1977 | White et al. ................. | 401/195 |
| 4,593,489 A | | 6/1986 | Gott et al. .................... | 43/137 |
| 4,653,222 A | * | 3/1987 | Viscosi ......................... | 43/137 |
| 4,759,150 A | | 7/1988 | Pierce .......................... | 43/136 |
| 4,787,171 A | * | 11/1988 | Dagenais ..................... | 43/137 |
| 4,812,069 A | * | 3/1989 | White et al. ................. | 401/195 |
| 4,905,408 A | * | 3/1990 | Wu .............................. | 43/137 |
| 5,522,174 A | | 6/1996 | Wagner et al. ................ | 43/137 |
| 5,634,293 A | | 6/1997 | Mike et al. .................... | 43/136 |
| 5,660,313 A | * | 8/1997 | Newbold ....................... | 225/42 |
| 6,055,767 A | * | 5/2000 | Carter .......................... | 43/137 |
| 6,067,746 A | * | 5/2000 | Kistner et al. ................ | 43/136 |
| 6,185,862 B1 | * | 2/2001 | Nelson ......................... | 43/136 |
| 6,276,859 B1 | * | 8/2001 | Hsu ............................. | 401/195 |
| 6,283,661 B1 | * | 9/2001 | Connors ....................... | 401/195 |
| 6,530,473 B1 | * | 3/2003 | St. Felix ....................... | 206/233 |

FOREIGN PATENT DOCUMENTS

| | | | |
|---|---|---|---|
| DE | 4038667 | * | 5/1992 |
| DE | 29608460 | * | 8/1996 |
| JP | 9-275873 | * | 10/1997 |

* cited by examiner

Primary Examiner—Peter M. Poon
Assistant Examiner—David J. Parsley
(74) Attorney, Agent, or Firm—Sturm & Fix LLP

(57) ABSTRACT

An improved fly swatting apparatus (10) including: a hollow handle member (20) provided with a dispensing slot (23) for disinfectant wipes (22), a shaft member (30) connected on one end (31) to the handle member (20) and connected to the other end (32) to the paddle element (41) of a paddle member (40) wherein, the opposed faces of the paddle element (41) are provided with pluralities of apertured adhesive sheets (43) (43) wherein, the apertures (44) (44) of the adhesive sheets (43) (43) are aligned with the apertures (42) (42) of the paddle element (41).

2 Claims, 1 Drawing Sheet

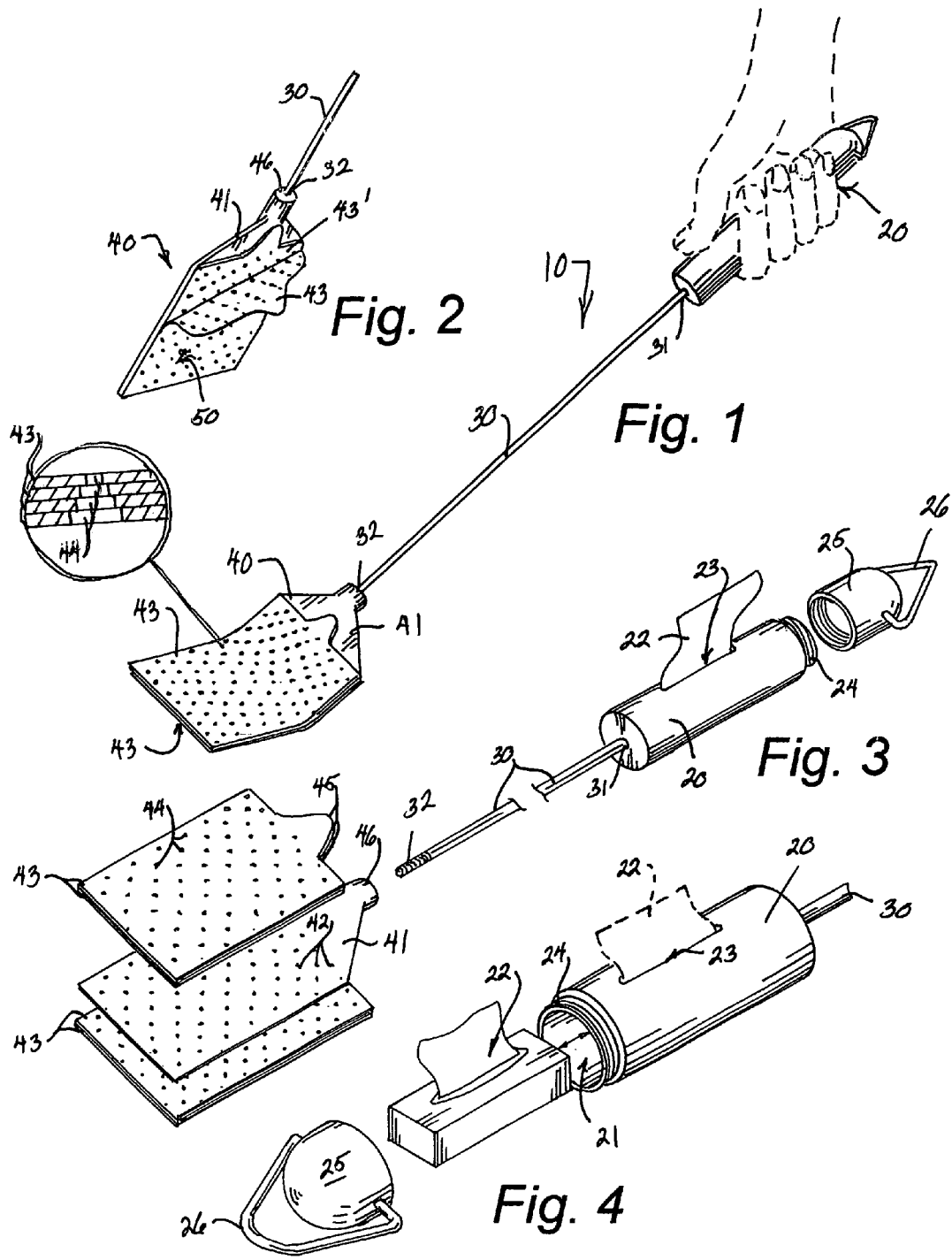

FLY SWATTING APPARATUS

CROSS REFERENCE TO RELATED APPLICATIONS

This invention was the subject of Document Disclosure Program Registration Number 547,611, that was filed in the United States Patent and Trademark Office on Feb. 24, 2004.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of fly swatters in general and in particular to a fly swatter having multiple layers of apertured adhesive sheets associated with the swatting paddle.

2. Description of Related Art

As can be seen by reference to the following U.S. Pat. Nos. 5,522,174; 5,634,293; 4,759,150; and, 4,593,489, the prior art is replete with myriad and diverse fly swatting devices.

While all of the aforementioned prior art constructions are more than adequate for the basic purpose and function for which they have been specifically designed, they are uniformly deficient with respect to their failure to provide a simple, efficient, and practical fly swatting apparatus that both kills and captures the carcasses of dead flies without contaminating the body of the fly swatter paddle.

As most people have experienced, while fly swatters are very efficient in killing flies and other bothersome insects, they have the tendency to propel the dead insect carcass away from the point of impact and to retain the body fluids and portions of the insect carcasses in the openings of the paddle.

This leaves the user of the fly swatter with the unenviable task of retrieving the dead insect carcass if they are fortunate enough to have seen where the insect landed after impact, and, if they are diligent about hygiene, they must also rinse off the head of the paddle after each use to remove the remains of the dead insect, as well as, clean the surface that the insect was resting upon when struck by the paddle.

As a consequence of the foregoing situation, there has existed a longstanding need for a new and improved fly swatting apparatus that simultaneously kills and captures the carcass of a dead insect on a removable adhesive surface and the provision of such an arrangement is the stated objective of the present invention.

BRIEF SUMMARY OF THE INVENTION

Briefly stated, the improved fly swatting apparatus that forms the basis of the present invention comprises in general a hollow handle member connected on one end of a shaft member wherein, the other end of the shaft member is connected to an apertured paddle member the opposite faces of which are provided with apertured adhesive sheets.

As will be explained in greater detail further on in the specification, the apertured sheets are dimensioned to slightly overlap one another to facilitate the removal of the uppermost sheets from the lowermost sheets wherein, the apertured openings in successive sheets increase in surface area to prevent the contamination of the underlying sheets.

In addition, the hollow handle member defines a dispensing receptacle for sanitary wipes that are introduced through a threaded opening in the handle member and withdrawn through a dispensing slot in the side of the handle member.

Furthermore, the threaded opening in the handle member is adapted to receive a threaded closure provided with a D-ring element for suspending the apparatus when not in use.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of the improved fly swatting apparatus that forms the basis of the present invention;

FIG. 2 is a detail view showing one of the adhesive sheets being removed from the paddle member;

FIG. 3 is an exploded perspective view of the apparatus; and,

FIG. 4 is an exploded detail view of the hollow handle member.

DETAILED DESCRIPTION OF THE INVENTION

As can be seen by reference to the drawings, and in particularly to FIG. 1, the improved fly swatting apparatus that forms the basis of the present invention is designated generally by the reference number 10. The apparatus 10 comprises in general a hollow handle member 20, a shaft member 30, and a paddle member 40. These structural components will now be described in seriatim fashion.

As can best be seen by reference to FIGS. 3 and 4, the hollow handle member 20 has a hollow interior that defines a chamber 21 that is dimensioned to receive a supply of disinfectant wipes 22 that are fed through a dispensing slot 23.

In addition, the hollow handle member 20 has a threaded proximal end 24 that is adapted to receive a threaded closure cap 25 provided with a ring element 26 that can be used to suspend the apparatus 10 from a hook or the like during storage.

Turning now to FIGS. 1 and 3, it can be seen that the shaft member 30 is elongated and in the preferred embodiment of the invention, is provided with a proximal end 31 that is secured to the distal end of the handle member 20 and a distal end 32 that is adapted to releasably engage the paddle member 40.

Furthermore, as can best be seen by reference to FIGS. 1 through 3, the paddle member 40 comprises a generally rigid yet flexible paddle element 41 provided with a plurality of air flow apertures 42 that are provided to reduce the drag of the paddle member 41 in a well recognized manner.

In addition, each of the opposed faces of the paddle element 41 is provided with a plurality of adhesive sheets 43 having a plurality of apertures 44 aligned with the apertures 42 in the paddle element 41 wherein, the adhesive sheets 43 are further provided with slightly overlapping tabs 45 that facilitate the removal of the top most sheet 43 from the underlying sheet 43' in a well recognized manner wherein, the tabs 45 are generally aligned with the threaded neck portion 46 of the paddle element 41 that is engageable with the threaded distal end 32 of the shaft member 30.

As was also mentioned previously, the apertures 44 in each of the adhesive sheets 43 increase in size as the layers of adhesive sheets 443 approach the opposite sides of the paddle element 41 so as to limit the contamination of the innermost sheets 43' when the outermost sheet 43 impacts the body of a fly or other insect 50.

At this juncture, it should be noted that in the preferred embodiment of the invention, the paddle member 40 is intended to be replaced by a new paddle member 40 once all of the adhesive sheets 43 on both sides of the paddle element 41 have been removed, and that the supply of disinfectant wipes 22 can also be replaced once the original supply has become depleted.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

What is claimed is:

1. An improved fly swatting apparatus comprising,
   a hollow handle member comprising an elongated slot disposed on an outer wall of said handle member,
   a shaft member having a proximal end and a distal end wherein, the proximal end of the shaft member is attached to the handle member;
   a paddle member operatively connected to the distal end of the shaft member and including a paddle element having opposed faces and provided with a plurality of air flow apertures wherein, both of the opposed faces of the paddle element are provided with a plurality of adhesive sheets having a plurality of generally circular apertures aligned with said air flow apertures and, wherein, the size of each of said pluralities of generally circular apertures increases as said pluralities of generally circular apertures approach said paddle element, and
   a box of disinfectant wipes disposed inside the hollow handle member, wherein, individual disinfectant wipes are adapted to be pulled through the elongated slot in the outer wall of the hollow handle member.

2. The apparatus as in claim 1; wherein, said handle member is further provided with a ring element.

* * * * *